United States Patent
Maurer et al.

(10) Patent No.: US 9,915,330 B2
(45) Date of Patent: Mar. 13, 2018

(54) FOUR PASS TORQUE CONVERTER

(71) Applicant: Ford Global Technologies, LLC, Dearborn, MI (US)

(72) Inventors: Jeffrey Edward Maurer, Commerce, MI (US); Gregory Daniel Goleski, Rochester Hills, MI (US); David Allen Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/937,449

(22) Filed: Nov. 10, 2015

(65) Prior Publication Data

US 2017/0130812 A1   May 11, 2017

(51) Int. Cl.
| | |
|---|---|
| *F16H 45/02* | (2006.01) |
| *F16D 47/04* | (2006.01) |
| *F16D 47/06* | (2006.01) |
| *F16D 25/0638* | (2006.01) |
| *F16D 48/02* | (2006.01) |

(52) U.S. Cl.
CPC ............. *F16H 45/02* (2013.01); *F16D 47/04* (2013.01); *F16D 25/0638* (2013.01); *F16D 2048/0221* (2013.01); *F16H 2045/021* (2013.01); *F16H 2045/0215* (2013.01); *F16H 2045/0284* (2013.01)

(58) Field of Classification Search
CPC ............... F16H 45/02; F16H 2045/021; F16H 2045/0205; F16D 47/04
See application file for complete search history.

(56) References Cited

U.S. PATENT DOCUMENTS

| | | | |
|---|---|---|---|
| 4,466,619 A | 8/1984 | Adams | |
| 7,246,692 B2 | 7/2007 | Braford | |
| 8,240,443 B2 | 8/2012 | Vahabzadeh et al. | |
| 8,627,934 B2 * | 1/2014 | Murata | F16H 45/02 |
| | | | 192/3.25 |
| 8,647,078 B2 | 2/2014 | Frait | |
| 8,689,958 B2 | 4/2014 | Noehl et al. | |
| 9,309,956 B2 * | 4/2016 | Lindemann | F16H 45/02 |

(Continued)

FOREIGN PATENT DOCUMENTS

DE   102012208495 A1   11/2013

OTHER PUBLICATIONS

Smart-Tech Input Housing Kit; Part No. 77733-06K, Sonnax, printed Sep. 17, 2015, http://www.sonnax.com/parts/2451, 2 pgs.

*Primary Examiner* — Jacob S. Scott
*Assistant Examiner* — Tinh Dang
(74) *Attorney, Agent, or Firm* — James Dottavio; Brooks Kushman P.C.

(57) ABSTRACT

A torque converter utilizes four distinct fluid passageways. The torque converter hydrodynamic chamber is supplied with fluid via a passageway that includes a gap between a stator shaft insert and a turbine shaft. Fluid returns from the hydrodynamic chamber via a passageway that is formed between a hollow stator shaft and the stator shaft insert. The torque converter includes a bypass clutch with an apply chamber and a return chamber. Fluid is routed to the apply chamber via a passageway that includes a gap between a hollow portion of the turbine shaft and a turbine shaft insert. Fluid is routed between the balance chamber and an elevated exhaust via a passageway that runs through the turbine shaft insert.

15 Claims, 6 Drawing Sheets

(56) References Cited

U.S. PATENT DOCUMENTS

| | | | |
|---|---|---|---|
| 2015/0198227 A1* | 7/2015 | Blough | F16H 45/02 192/3.26 |
| 2016/0017971 A1* | 1/2016 | Sayre | F16H 45/02 192/3.29 |
| 2016/0116044 A1* | 4/2016 | Frait | F16H 45/02 192/3.29 |
| 2017/0023116 A1* | 1/2017 | Jewell | F16H 45/02 |

* cited by examiner

FOUR PASS TORQUE CONVERTER

TECHNICAL FIELD

This disclosure relates to the field of automatic transmissions for motor vehicles. More particularly, the disclosure pertains to a transmission with four fluid passageways to a torque converter.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

FIG. 1 illustrates a powertrain 10 with a transmission 12. The flow of mechanical power is illustrated by solid lines, while dashed lines indicate the flow of information signals, which may be conveyed electrically or hydraulically. Power is generated by engine 14 and conveyed to a transmission input shaft 16. A torque converter 18 and gearbox 20 modify the speed and torque at which the power is delivered to match vehicle requirements while permitting engine 14 to run at a suitable crankshaft speed. Power flows from the torque converter to the gearbox via a turbine shaft 22. Driveshaft 24 transfers power from transmission 12 to differential 26. Differential 26 distributes the power between drive wheels 28 and 30 while allowing slight speed differences such as when turning a corner. Some transmissions, such as front wheel drive transaxles, may include the differential in the same housing with the gearbox and torque converter. In such transmissions, power transfer to the differential may utilize gears or chains as opposed to a driveshaft. In some vehicles, a transfer case may be interposed between the transmission and differential to transfer some power to additional wheels.

Transmission controller 32 adjusts the state of transmission 12 based on various inputs, including vehicle speed measurements, driver torque demand as indicated by accelerator pedal position, and a shift selector. Controller 32 may adjust the state of the transmission by sending electrical signals to valve body 34. In response to these signals, valve body 34 adjusts the pressure in hydraulic circuits to engage particular clutches, such as clutches within gearbox 20 and a bypass clutch within torque converter 18.

FIG. 2 schematically illustrates a torque converter 18. Impeller 40 is fixed to input shaft 16 and supported by transmission case 42. In operation, the space enclosed by these components is filled with transmission fluid. Turbine shaft 22 is drivably connected to turbine 44. A torsional damper may be interposed between turbine 44 and turbine shaft 22 to isolate gearbox 20 and other driveline components from engine vibrations. Stator 46 is coupled to transmission case 42 via one way clutch 48. When the turbine shaft is stationary or rotating slowly relative to transmission input shaft 16, one-way-clutch 48 holds stator 46 stationary. Rotation of impeller 40 forces fluid to move between the impeller, the turbine, and the stator. The fluid exerts a hydro-dynamic torque on the turbine 44. Stator 46 provides a reaction force such that the torque on turbine 44 can be greater than the torque on impeller 40. When the speed of turbine 44 approaches that of impeller 40, fluid tends to flow around the centerline 50, causing one-way-clutch 48 to overrun. The chamber 52 that includes the turbine, the impeller, and the stator is called the hydro-dynamic chamber.

To improve power transfer efficiency once the vehicle reaches a sufficient speed, the controller may engage bypass clutch 54 to selectively couple transmission input shaft 16 to turbine shaft 22. Clutch pack 56 includes one or more plates that rotate with input shaft 16 interleaved with one or more plates that rotate with turbine shaft 22. To engage the clutch, pressurized fluid is routed to apply chamber 58 forcing piston 60 to compress clutch pack 56. When the pressure is released, spring 62 forces piston 60 away from the clutch pack. Fluid pressure in balance chamber 64 also tends to push piston 60 away from clutch pack 56. Balance chamber 64 may be filled with fluid at low pressure such that fluid pressurization due to centrifugal forces are canceled out. The controller may partially apply clutch 54 such that the speed difference between the input shaft 16 and turbine shaft 22, called the slip, is a desired amount. During partial clutch application, some torque is transferred by clutch 54 and the remainder of the input torque is transferred hydro-dynamically via the impeller, stator, and turbine. Precise control of the torque capacity of clutch 54 is required to maintain a desired slip.

SUMMARY OF THE DISCLOSURE

A transmission includes a torque converter, a front support, a hollow stator shaft, a one-way-clutch, a hollow stator shaft insert, a hollow turbine shaft, and a hollow turbine shaft support. The torque converter includes an impeller, a turbine, and a stator. The torque converter may also include a bypass clutch configured to selectively couple the impeller to the turbine. The front support defines four fluid passageways which may be located at a common axial position. A valve body may supply fluid to the torque converter via the second fluid passageway and receive fluid from the torque converter via the first fluid passageway. The stator is connected to the front support via the one-way-clutch and the hollow stator shaft. A first of the fluid passageways of the front support is fluidly connected to a gap between the stator shaft and the stator shaft insert. The turbine shaft is driveably connected to the turbine and extends through the stator shaft insert. A second of the fluid passageways is fluidly connected to a gap between the stator shaft insert and the turbine shaft. A third of the fluid passageways is fluidly connected to a gap between the turbine shaft and the turbine shaft insert. A fourth fluid passageway is fluidly connected to an interior of the turbine shaft insert. The third fluid passageway may be fluidly connected to an apply chamber of the bypass clutch and the fourth fluid passageway may be fluidly connected to a balance chamber of the bypass clutch. The fourth fluid passageway may also be fluidly connected to an elevated exhaust.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
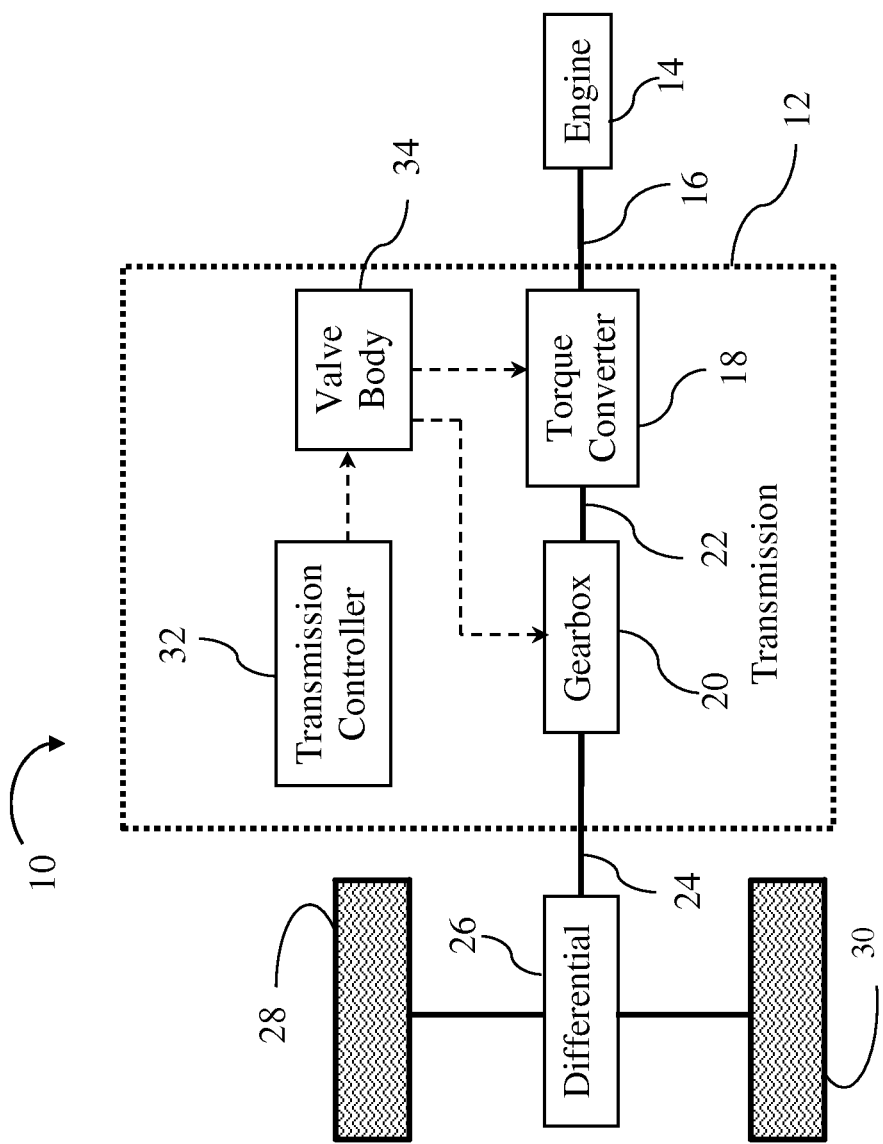
FIG. 1 is a schematic representation of a vehicle powertrain.
Figure 2:
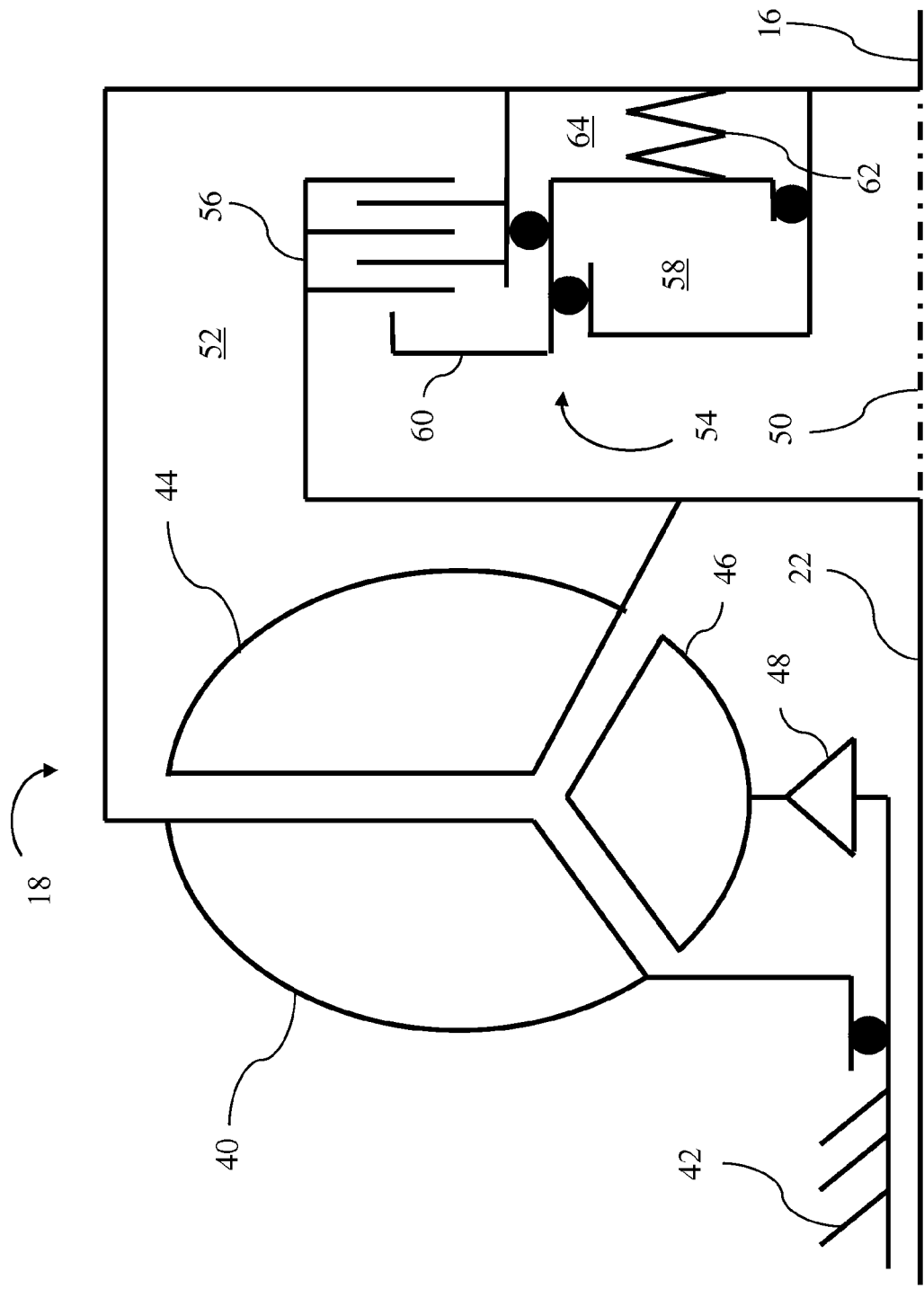
FIG. 2 is a schematic representation of a torque converter suitable for use in the powertrain of FIG. 1.
Figure 3:
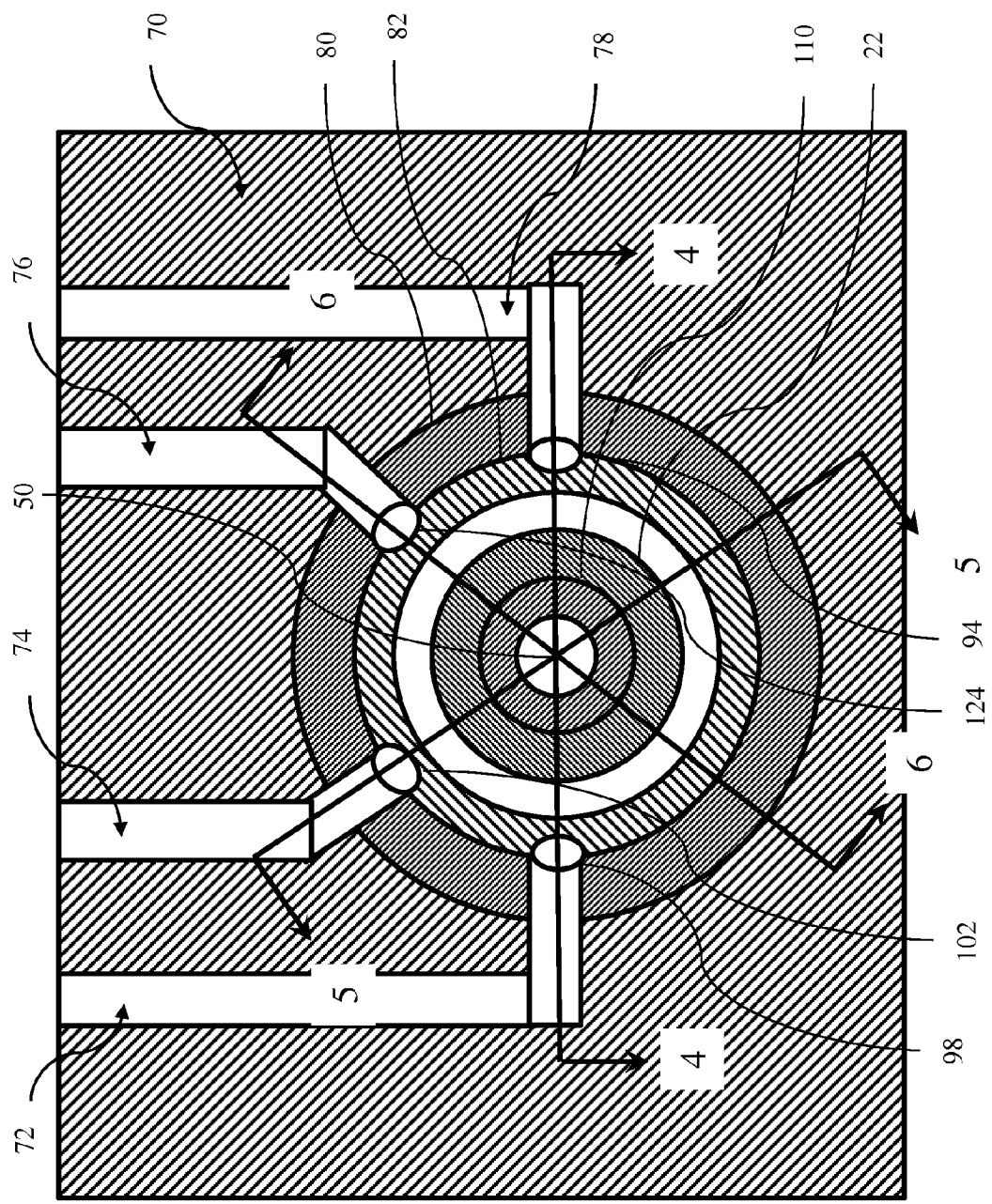
FIG. 3 is a cross section of a front transmission front support.

FIG. 3 shows an end view of a portion of transmission front support 70 which is part of transmission case 42. Four fluid passageways 72, 74, 76, and 78 are formed within front support 70. Each passageway extends radially away from the centerline 50 at a common axial position. The four passageways are separated circumferentially from one another. These four passageways are utilized to transmit fluid to or from various places in torque converter 18 as described below with reference to cross sections 4, 5, and 6.

Figure 4:
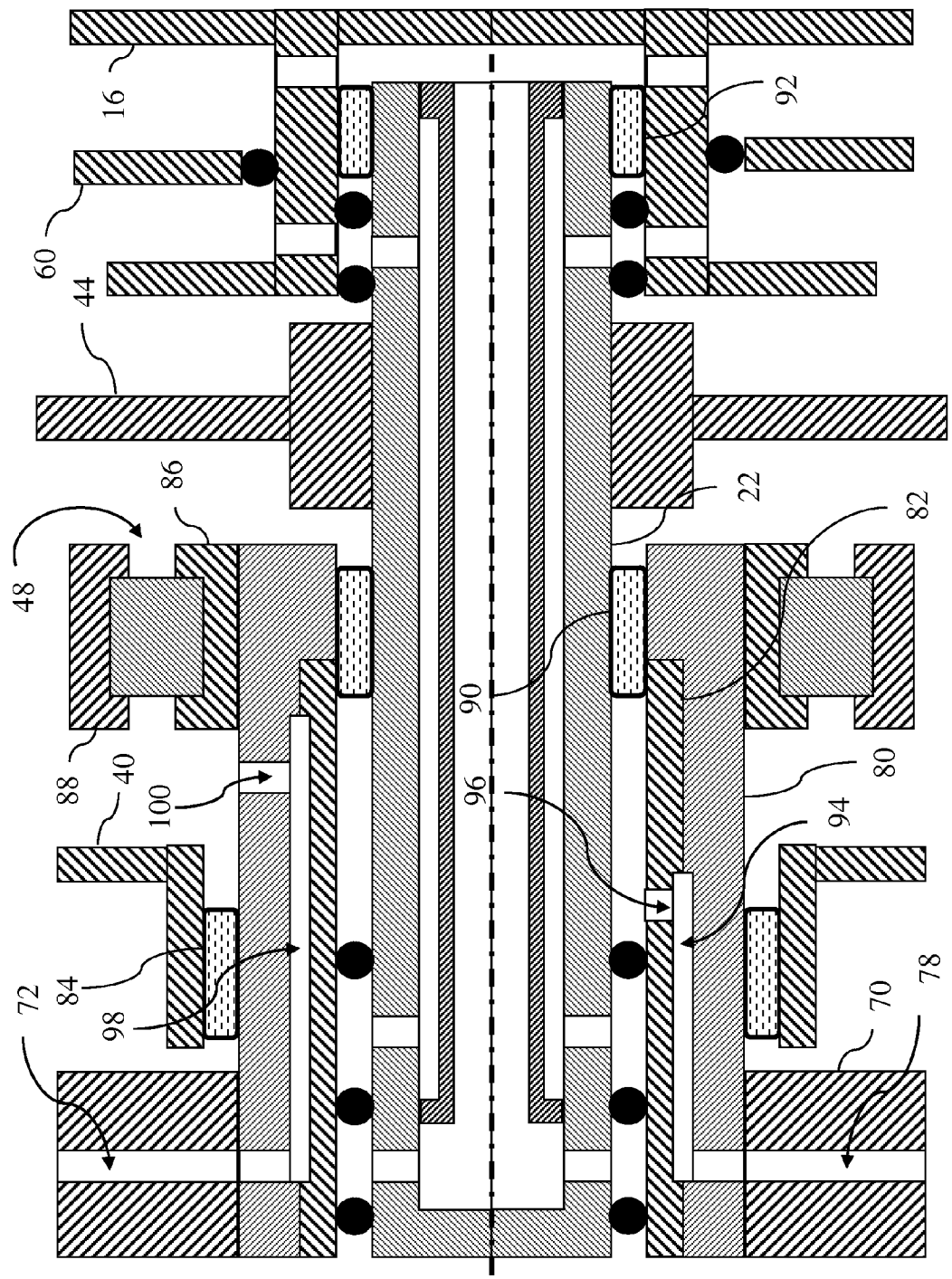
FIG. 4 is a first cross section of a central section of a torque converter assembly.

FIG. 4 illustrates the fluid pathways used to supply fluid to the hydro-dynamic chamber 52. Stator support shaft 80 is a hollow shaft fixed to front support 70. A hollow insert 82 is fixed to the interior of stator support shaft 80. Impeller 40 is supported for rotation about stator support 80 by bearings or bushing 84. One-way-clutch 48 has an inner race 86 fixed to stator support shaft 80 and an outer race 88 fixed to stator 46. Turbine shaft 22 is supported for rotation with respect to the stator shaft by bearings 90 and for rotation with respect to input shaft 16 by bearings 92.

A groove is formed into the inner surface of stator shaft 80 and/or the outer surface of insert 82 to form an axial passageway 94 connected to radial channel 78. The axial channel continues through a hole 96 in the insert into the space between the insert and turbine shaft 22. Fluid is supplied to the hydro-dynamic chamber by the valve body through radial channel 78, axial channel 94, between bearings 90 and then into the hydro-dynamic chamber between one-way-clutch 48 and turbine 44. Another groove is formed into the inner surface of stator shaft 80 and/or the outer surface of insert 82 to form an axial passageway 98 connected to radial channel 72. Fluid exits the hydro-dynamic chamber between one-way-clutch 48 and impeller 40 through hole 100 in stator support shaft 80. From there, it flows back to the valve body through axial channel 98 and radial channel 72.

Figure 5:
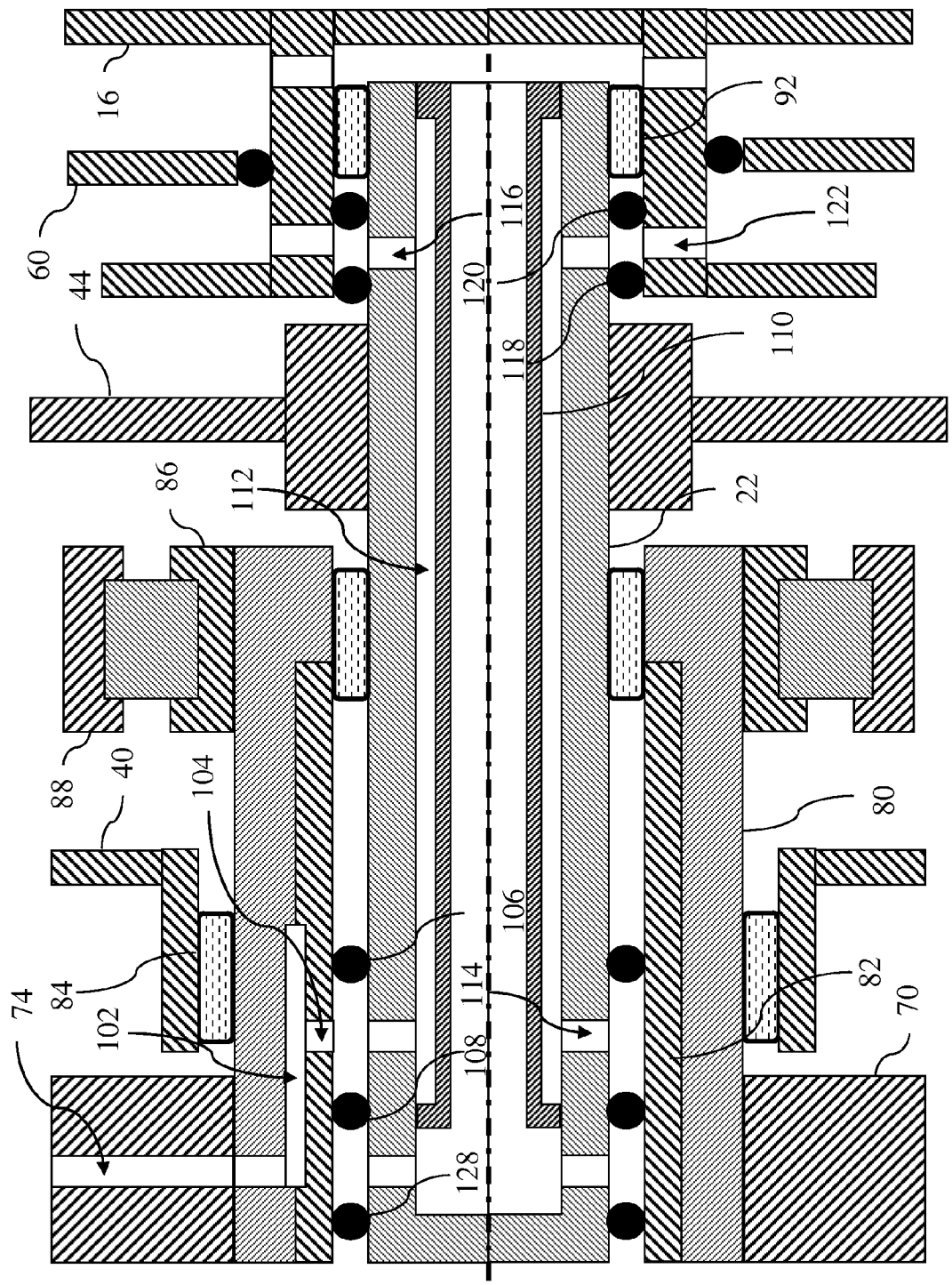
FIG. 5 is a second cross section of a central section of a torque converter assembly.

FIG. 5 illustrates the fluid pathways used to route pressurized fluid to apply chamber 58 of bypass clutch 54. Another groove is formed into the inner surface of stator shaft 80 and/or the outer surface of insert 82 to form an axial passageway 102 connected to radial channel 74. Fluid flows from passageway 102 through hole 104 into the space between insert 82 and turbine shaft 22 and between seals 106 and 108. A hollow insert 110 is fixed to the interior of hollow section of turbine shaft 22. The space between insert 110 and turbine shaft 22 forms an axial passageway 112. Fluid flows through hole 114 in turbine shaft 22, though passageway 112, and then through hole 116 into the space between turbine shaft 22 and input shaft 16 and between seals 118 and 120. From there, it continues through hole 122 into apply chamber 58. When piston 60 is forced into the disengaged position, fluid flows back to the valve body through the same series of passageways.

Figure 6:
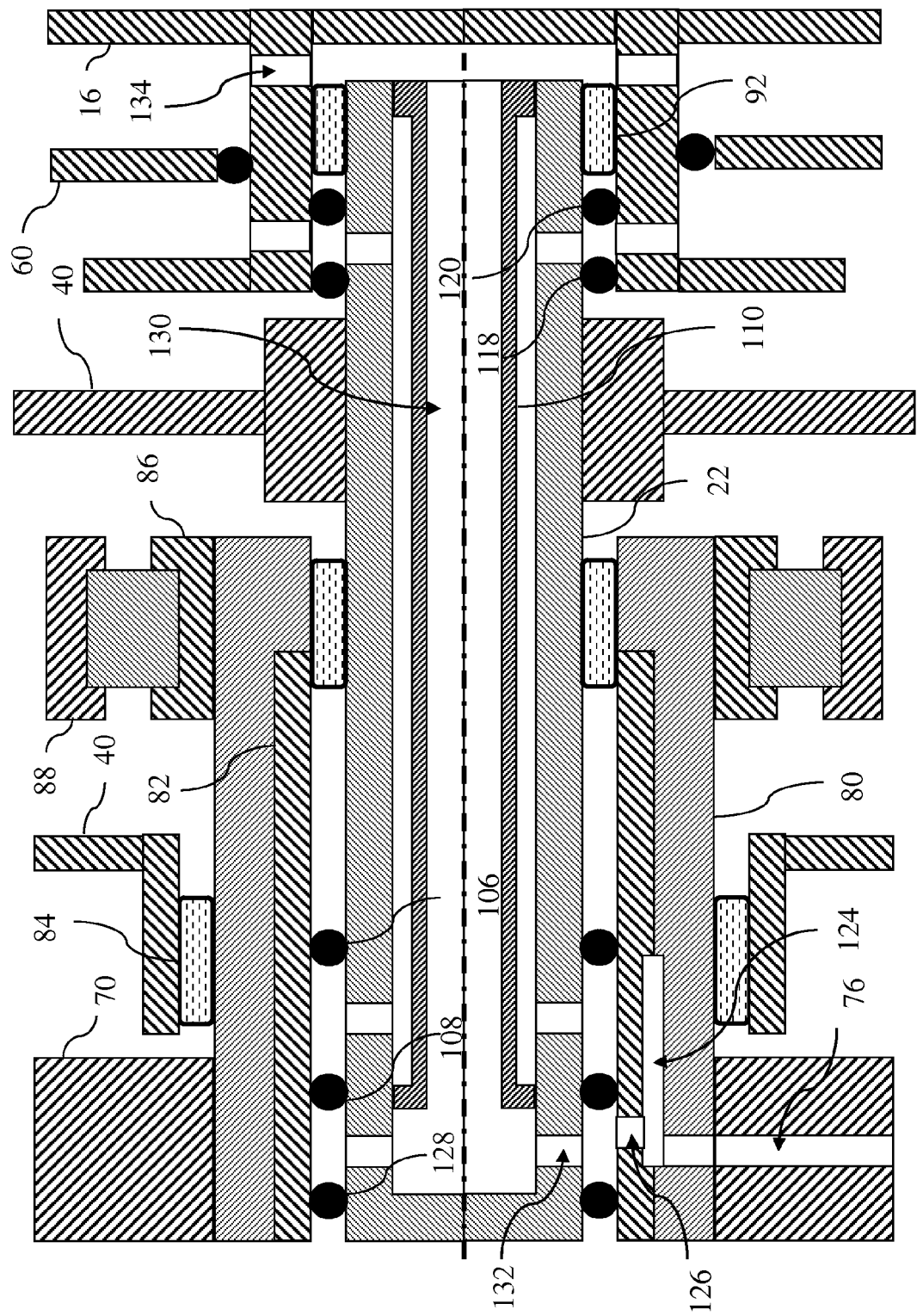
FIG. 6 is a third cross section of a central section of a torque converter assembly.

FIG. 6 illustrates the fluid pathways used to route fluid between balance chamber 64 of bypass clutch 54 and front support 70. Another groove is formed into the inner surface of stator shaft 80 and/or the outer surface of insert 82 to form an axial passageway 124 connected to radial channel 76. Passageway 124 is connected through hole 126 to the space between seals 108 and 128. The interior of hollow insert 110 forms an axial passageway 130 which is connected to the space between seals 108 and 128 by hole 132. The end of passageway 130 is connected to balance chamber 64 by hole 134.

In some embodiments, radial passageway 76 may be supplied with low pressure fluid by the valve body. In other embodiments, balance chamber may be filled with fluid via an orifice between balance chamber 64 and the hydrodynamic chamber 52. This orifice is sized such that the flow rate is low. When piston 60 is stroked, fluid must exit balance chamber 64 relatively quickly without increasing substantially in pressure. The pathway illustrated in FIG. 6 allows the fluid to exit quickly. The fluid may be routed from radial passageway 76 to an elevated exhaust within the transmission from which it drains to the sump. By elevating the exhaust port, the passageway remains filled with fluid when the vehicle is off and the transmission pump is not operating. When the piston is de-stroked, fluid contained within this pathway flows rapidly into balance chamber 64.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
   a torque converter including an impeller, a turbine, and a stator;
   a front support defining first through fourth fluid passageways;
   a hollow stator shaft fixed to the front support;

a one-way-clutch having a first race fixed to the stator shaft and a second race fixed to the stator;

a hollow stator shaft insert fixed to an interior of the stator shaft, the first fluid passageway fluidly connected to a gap between the stator shaft and the stator shaft insert;

a hollow turbine shaft driveably connected to the turbine and extending through the stator shaft insert, the second fluid passageway fluidly connected to a gap between the stator shaft insert and the turbine shaft; and a hollow turbine shaft insert fixed to an interior of the turbine shaft, the third fluid passageway fluidly connected to a gap between the turbine shaft and the turbine shaft insert and the fourth fluid passageway fluidly connected to an interior of the turbine shaft insert.

2. The transmission of claim 1 wherein the four fluid passageways are located at a common axial position relative to an axis of the turbine shaft and are separated circumferentially.

3. The transmission of claim 1 further comprising a bypass clutch configured to selectively couple the impeller to the turbine, the bypass clutch defining an apply chamber fluidly connected to the third fluid passageway and defining a balance chamber fluidly connected to the fourth fluid passageway.

4. The transmission of claim 3 further comprising a valve body configured to supply transmission fluid to the torque converter via the second fluid passageway and to receive transmission fluid from the torque converter via the first axial passageway.

5. A transmission comprising:
a torque converter having a clutch assembly and a hydrodynamic chamber;
a stator support defining a first axial passageway fluidly connected to the hydrodynamic chamber;
a turbine shaft supported for rotation within the stator support and defining second and third axial passageways fluidly connected to the clutch assembly, a space between the stator support and turbine shaft forming a fourth axial passageway fluidly connected to the hydrodynamic chamber; and
a front support fixed to the stator support and defining four radial passageways, each fluidly connected to one of the first through fourth axial passageways.

6. The transmission of claim 5 wherein the four radial passageways are located at a common axial position relative to an axis of the stator support and are separated circumferentially.

7. The transmission of claim 5 further comprising a valve body fluidly connected to at least three of the four radial passageways.

8. The transmission of claim 7 wherein the valve body is configured to supply transmission fluid to the hydrodynamic chamber via the fourth axial passageway and to receive transmission fluid from the hydrodynamic chamber via the first axial passageway.

9. The transmission of claim 7 wherein the clutch assembly defines an apply chamber fluidly connected to the second axial passageway and a balance chamber fluidly connected to the third axial passageway.

10. The transmission of claim 9 wherein the third axial passageway is fluidly connected to an elevated exhaust port.

11. The transmission of claim 5 wherein the turbine shaft comprises a hollow insert within a hollow section of an outer shaft, an interior of the hollow insert forming one of the second and third axial passageways and a space between the insert and the outer shaft forming another of the second and third axial passageways.

12. The transmission of claim 5 wherein the stator support comprises a hollow insert within a hollow outer shaft, a space between the insert and the outer shaft forming the first axial passageway.

13. A transmission comprising:
a front support defining first through fourth fluid passageways;
a hollow stator shaft fixed to the front support;
a hollow stator shaft insert fixed to an interior of the stator shaft, the first fluid passageway fluidly connected to a gap between the stator shaft and the stator shaft insert;
a hollow turbine shaft extending through the stator shaft insert, the second fluid passageway fluidly connected to a gap between the stator shaft insert and the turbine shaft; and
a hollow turbine shaft insert fixed to an interior of the turbine shaft, the third fluid passageway fluidly connected to a gap between the turbine shaft and the turbine shaft insert and the fourth fluid passageway fluidly connected to an interior of the turbine shaft insert.

14. The transmission of claim 13 further comprising a torque converter having a clutch assembly and a hydrodynamic chamber, the hydrodynamic chamber fluidly connected to the first and second fluid passageways, the clutch assembly defining an apply chamber fluidly connected to the third passageway and a balance chamber fluidly connected to the fourth passageway.

15. The transmission of claim 13 wherein the four fluid passageways are located at a common axial position relative to an axis of the turbine shaft and are separated circumferentially.

* * * * *